(12) United States Patent
Little et al.

(10) Patent No.: US 6,709,146 B1
(45) Date of Patent: Mar. 23, 2004

(54) THERMOKINETIC MIXER AND METHOD OF USING

(76) Inventors: David Little, 1755 N. 2000 West, Brigham City, UT (US) 84302; David Rice, 1755 N. 2000 West, Brigham City, UT (US) 84302

(*) Notice: Subject to any disclaimer, the term of this patent is extended or adjusted under 35 U.S.C. 154(b) by 0 days.

(21) Appl. No.: 09/628,236

(22) Filed: Jul. 28, 2000

(51) Int. Cl.$^7$ .............................. B29B 7/42; B29B 7/44
(52) U.S. Cl. ........................................ 366/76.3; 366/81
(58) Field of Search ................... 366/97–99, 325.1, 366/325.92, 330.2, 81, 76.3, 76.9, 77

(56) References Cited

U.S. PATENT DOCUMENTS

| | | | |
|---|---|---|---|
| 1,424,445 A | * | 8/1922 | Bowen et al. |
| 3,591,146 A | * | 7/1971 | Sutter |
| 3,652,062 A | * | 3/1972 | Baker |
| 3,776,529 A | * | 12/1973 | Sutter et al. |
| 4,013,616 A | | 3/1977 | Wallace |
| 4,123,584 A | | 10/1978 | Brewton |
| 4,789,597 A | | 12/1988 | Gupta et al. |
| 4,808,665 A | | 2/1989 | Patel et al. |
| 5,300,267 A | | 4/1994 | Moore |
| 5,895,790 A | | 4/1999 | Good |
| 6,022,137 A | * | 2/2000 | White et al. |

OTHER PUBLICATIONS

Brochure (4 p., publication date 1998) : Title: Drais/Draiswerke Gelimat System for Ultrahigh–Speed Thermokinetic Mixing, Compounding.

Fluxing Drais News, vol. 1, No. 4, 8 p. (publication date 1998).

* cited by examiner

Primary Examiner—Charles E. Cooley
Assistant Examiner—David Sorkin
(74) Attorney, Agent, or Firm—David T. Bracken

(57) ABSTRACT

The present invention comprises a novel thermokinetic mixer. In one form of the invention, the mixing chamber shaft projections are removable at least in part and replaceable without cutting the projections from the shaft. In another form of the invention, only a tip portion of such projections are removable and replaceable without such cutting. In yet another form of the invention, shaft projections into the mixing chamber comprise a tooth having a substantially reticulated face forming a deflecting surface such that substantially all mixing chamber particles encountering the tooth strike and are deflected at an incident substantially lateral angle from the deflecting surface.

16 Claims, 12 Drawing Sheets

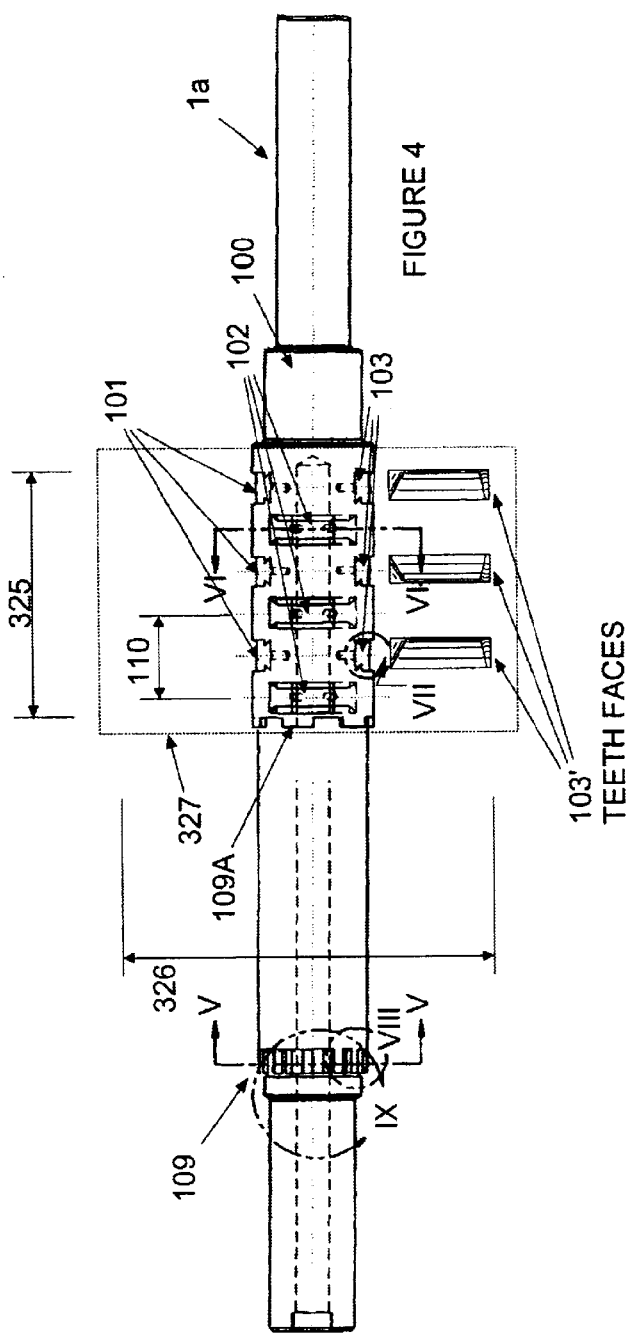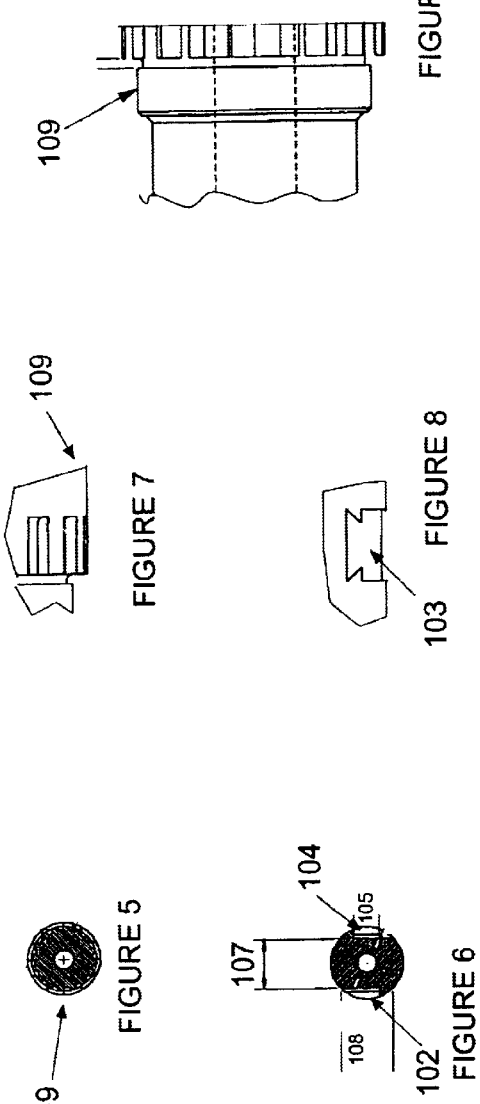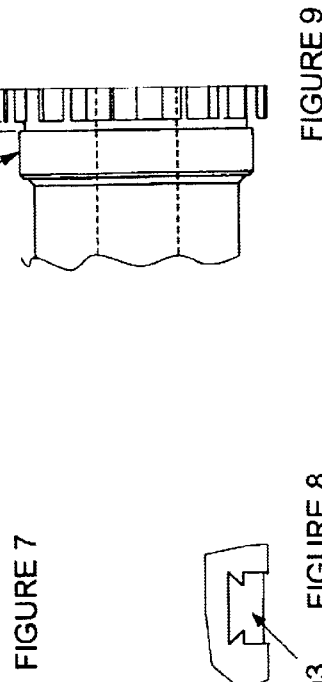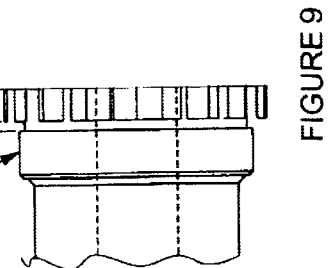

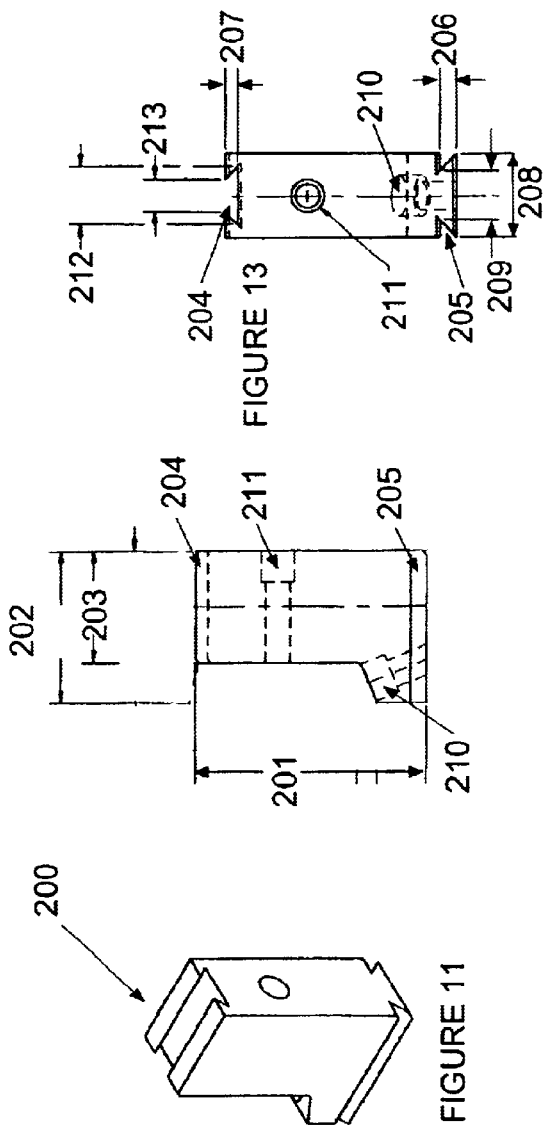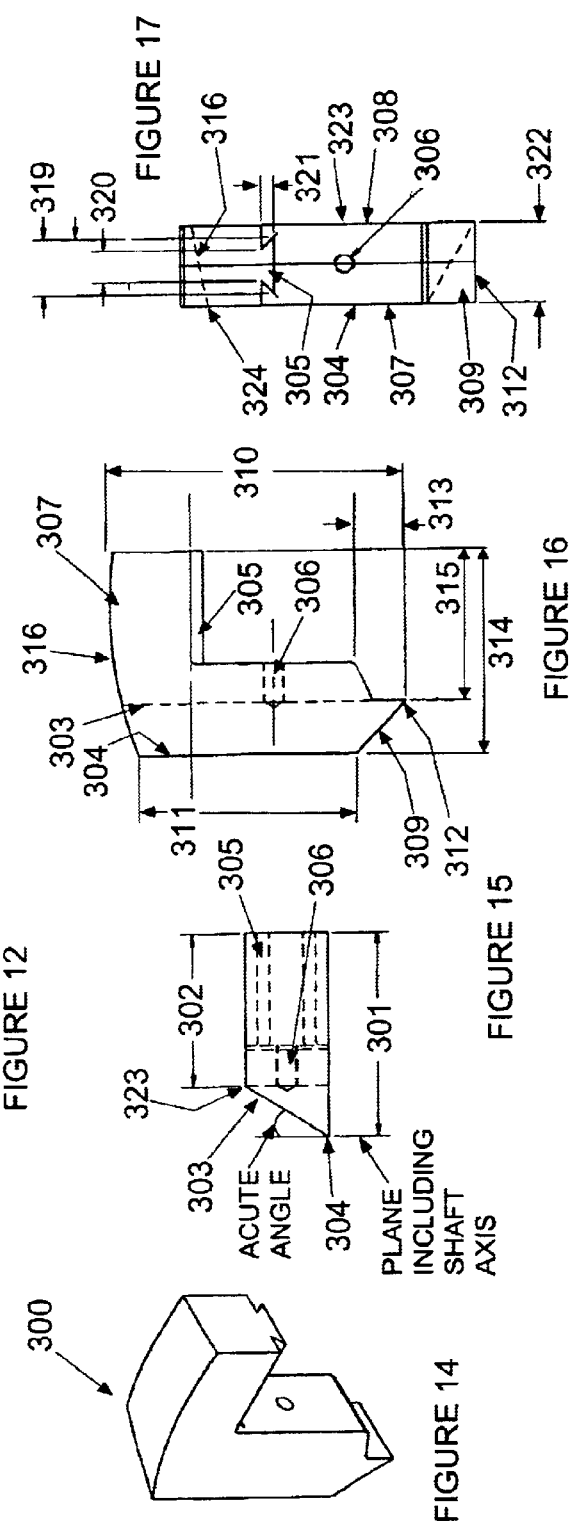

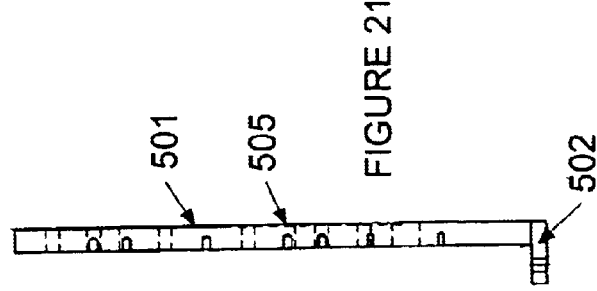
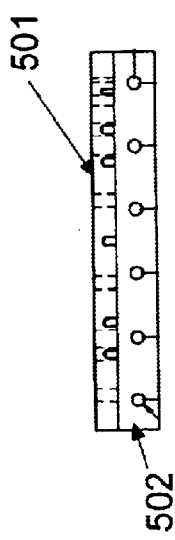
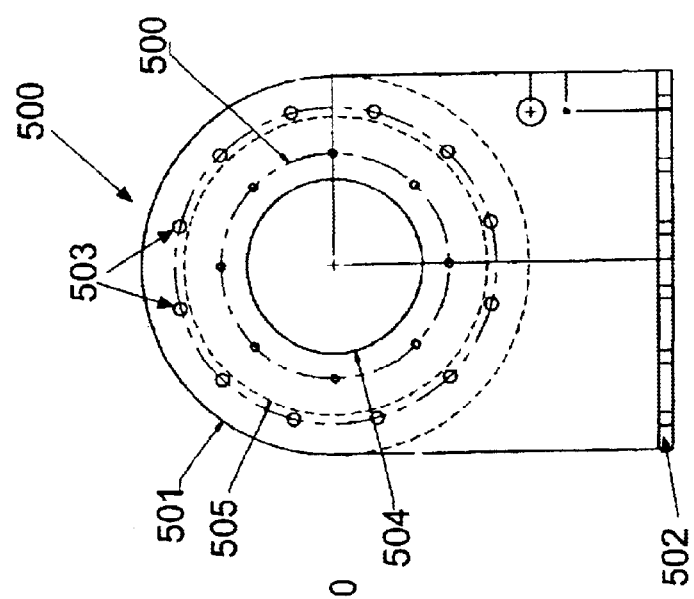

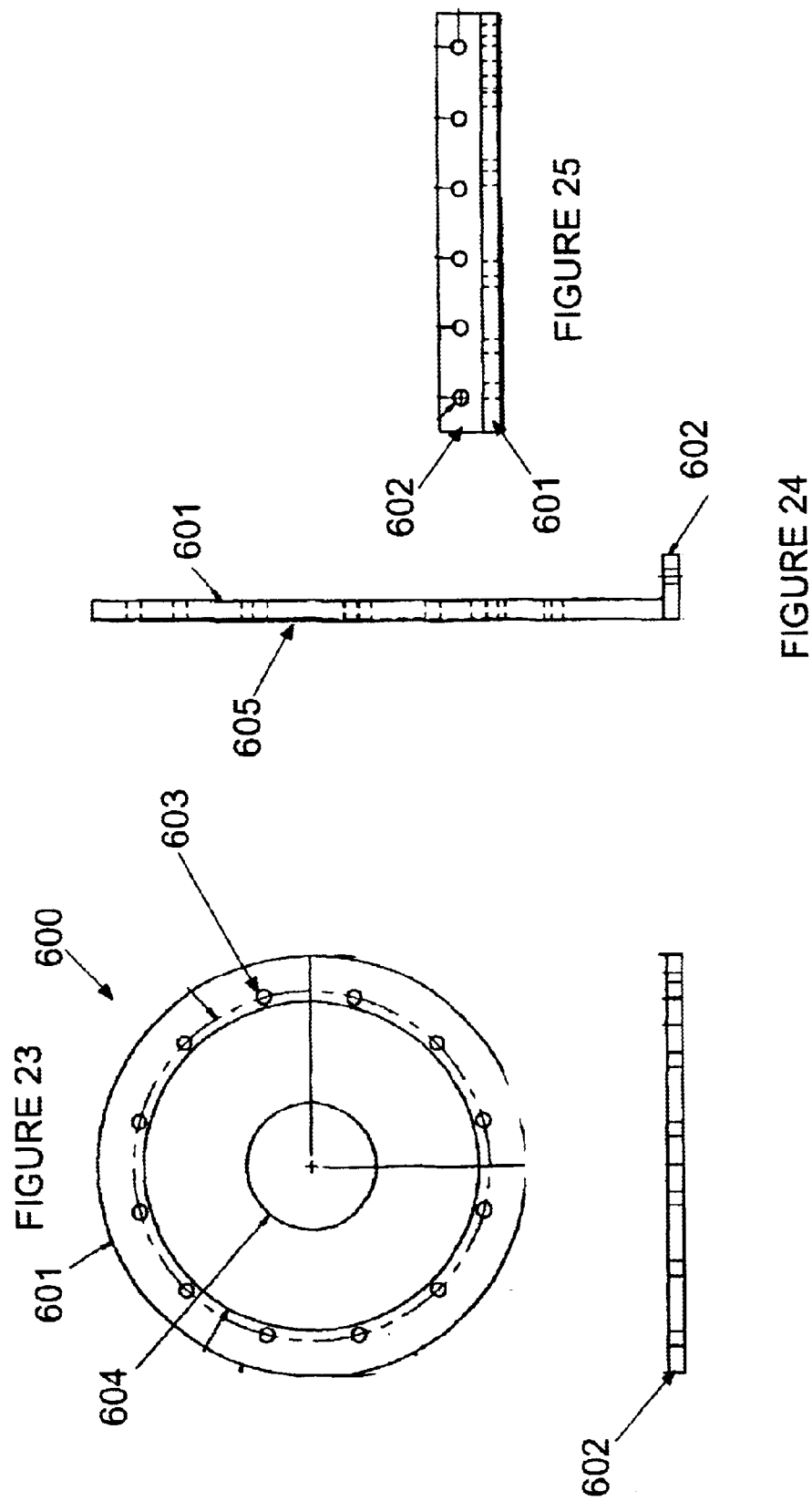

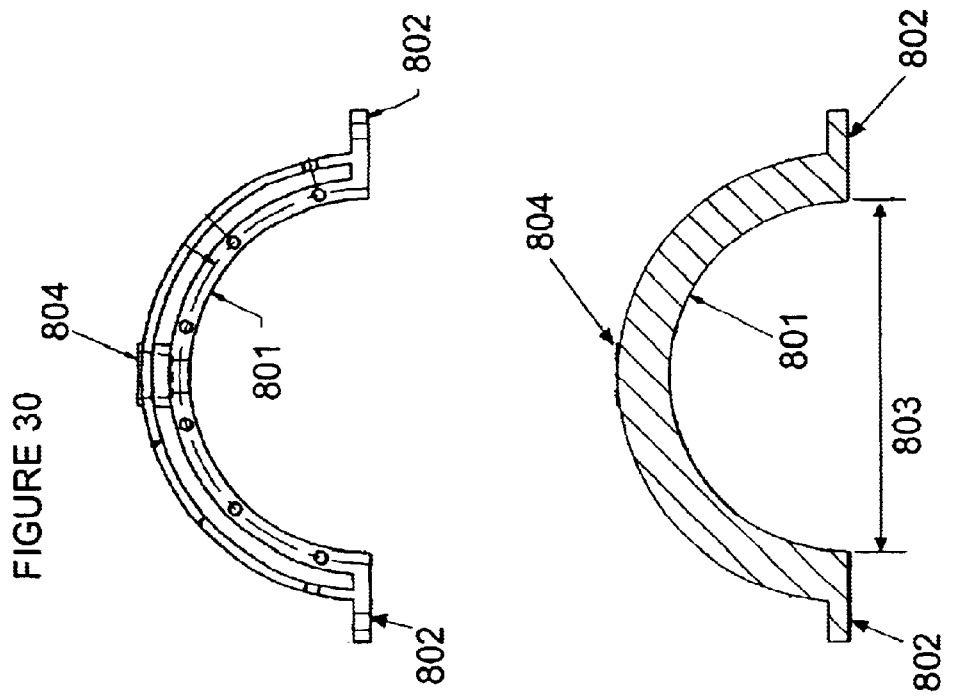
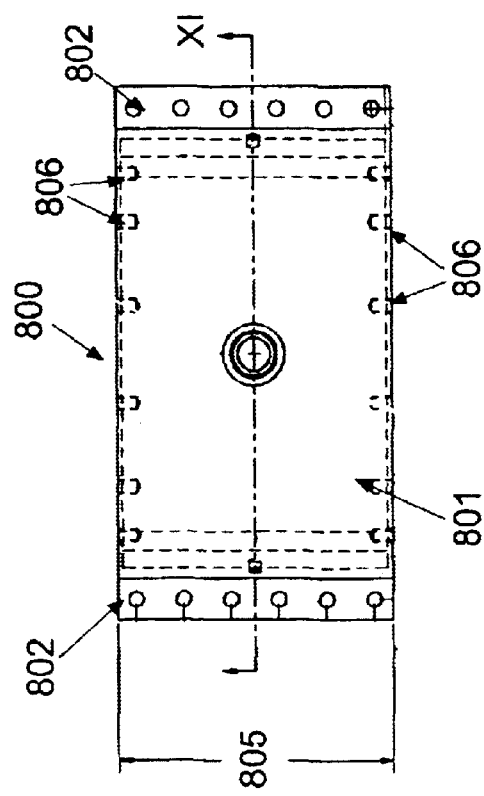

US 6,709,146 B1

THERMOKINETIC MIXER AND METHOD OF USING

BACKGROUND OF THE INVENTION

The present invention relates to thermokinetic mixers.

U.S. Pat. No. 5,895,790 discloses thermokinetic mixers used for melt blending, a novel application for that device. The invention therein economically recovered polymer blends and waste thermoset material into useful products by first forming a predictable quality thermoset material from disparate polymers and then melt blending the thermoset material with a thermoplastic material into the useful products.

U.S. Pat. No. 4,808,665 discloses shaped articles are made from blends of rubber and plastic in which the rubber is in the form of discrete vulcanized particles dispersed in the plastic. After shaping the articles, they are exposed to freeradical crosslinking which converts the blends from thermoplastics to thermosets. The blends were formed in a low rotation speed device operating at around 100 rpm.

U.S. Pat. No. 4,789,597 discloses an very important teaching in the prior art with regard to thermokinetic mixers, or "high flux" mixers as disclosed in that patent. It is critical to the effective operation of the device to prevent melting of the chamber processed particles. In this patent, chemically reactive agents are locked to particles of suitable synthetic resins without "wholly fluxing" or melting the resins. Thus a high quality intermediate product is obtained having no premature reaction taking place, suitable for further techniques. The process comprises the steps of intensively mixing and thermokinetically heating a batch of finely divided resin particles, with a chemically reactive agent, in an enclosed mixing chamber with a plurality of blades attached to arms rotating about a central axis within the chamber, and having a blade tip speed of at least about 18 meters per second, mixing the batch until the chemically reactive agent is locked to the resin particles, ensuring that temperature of the batch stays well below decomposition temperature of the reactive agent and below fluxing temperature of the resin particles, discharging the batch from the mixing chamber and cooling the discharged batch to avoid agglomeration of the resin particles. It is clear from the Table I disclosure in that patent that operating with tip speeds in excess of an allowable level for a specific polymer will result in unwanted "occasional agglomerates" which must be separated from and disposed

SUMMARY OF THE INVENTION

The present invention comprises a novel thermokinetic mixer. In one form of the invention, the mixing chamber shaft projections are removable at least in part and replaceable without cutting the projections from the shaft. In another form of the invention, only a tip portion of such projections are removable and replaceable without such cutting.

In yet another form of the invention, shaft projections into the mixing chamber comprise a tooth having a substantially reticulated face forming a deflecting surface such that substantially all mixing chamber particles encountering the tooth strike and are deflected at an incident substantially lateral angle from the deflecting surface.

The invention having deflecting surfaces comprises a novel method of melt blending many grades and processing products of single polymers for primary formation into a useful product or recycling into useful products as well as forming products from a wide variety of post-user or post-consumer polymers, especially those previously unknown to be reformable into useful products such as for PVC and styrene in high relative weight percent relative to all polymers in such a product.

The invention also comprises a two piece tooth effectively attached to the rotating shaft. At least one of the pieces comprises the entire deflecting surface which is easily replaceable after substantial wear from high speed and/or high temperature use in melt blending or physical compounding polymers within the mixing chamber. It has been unknown that the high temperature and/or high speed use of a thermokinetic mixer to melt blend polymers as in the Good patent (U.S. Pat. No. 5,895,790) would cause dramatically accelerated wear on the prior art thermokinetic mixer shaft extensions. The prior art use outside of the Good patent repeatedly confine operation of such mixers to strict limits on upper temperatures and rotation speeds. Outside of the Good patent, the prior art used thermokinetic mixers only for compounding short of melt blending or chemical reaction between particles, i.e., the product does not emerge from the mixing chamber in a molten state. The present inventors found to their surprise that exceeding the recommended mixture temperatures and rotation speeds as disclosed in the Good patent resulted in short effective life for the shaft extensions which drive the mix chamber particles into the side walls of the mix chamber to achieve the melt blending effect.

In yet another aspect of the present invention, the disclosed patterns of deflecting surfaces as developed in the side by side arrangement of shaft-axis rows of teeth have especially advantageous effects in achieving melt blending of a wider range of polymers than contemplated in the Good patent.

BRIEF DESCRIPTION OF THE DRAWINGS

FIG. 4 is a side view of the shaft components and a sample set of teeth faces.

FIGS. 5–9 are respectively cross sections V—V and VI—VI and sections VII, VIII and XI of FIG. 4.

FIGS. 11–13 are perspective, side and end views of a tooth base according to the invention.

FIGS. 14–17 are perspective, top, side and end views of a tooth according to the invention.

Respectively for the feed screw end plate and the shaft end plate are FIGS. 20–21 and 22–24, the series of three figures being respectively side, edge and top views.

Respectively for the bottom housing and top housing are FIGS. 26–28 and 29–31, the series of three figures being respectively top, end and Section X and XI views.

DETAILED DESCRIPTION OF THE INVENTION

Figure 1:
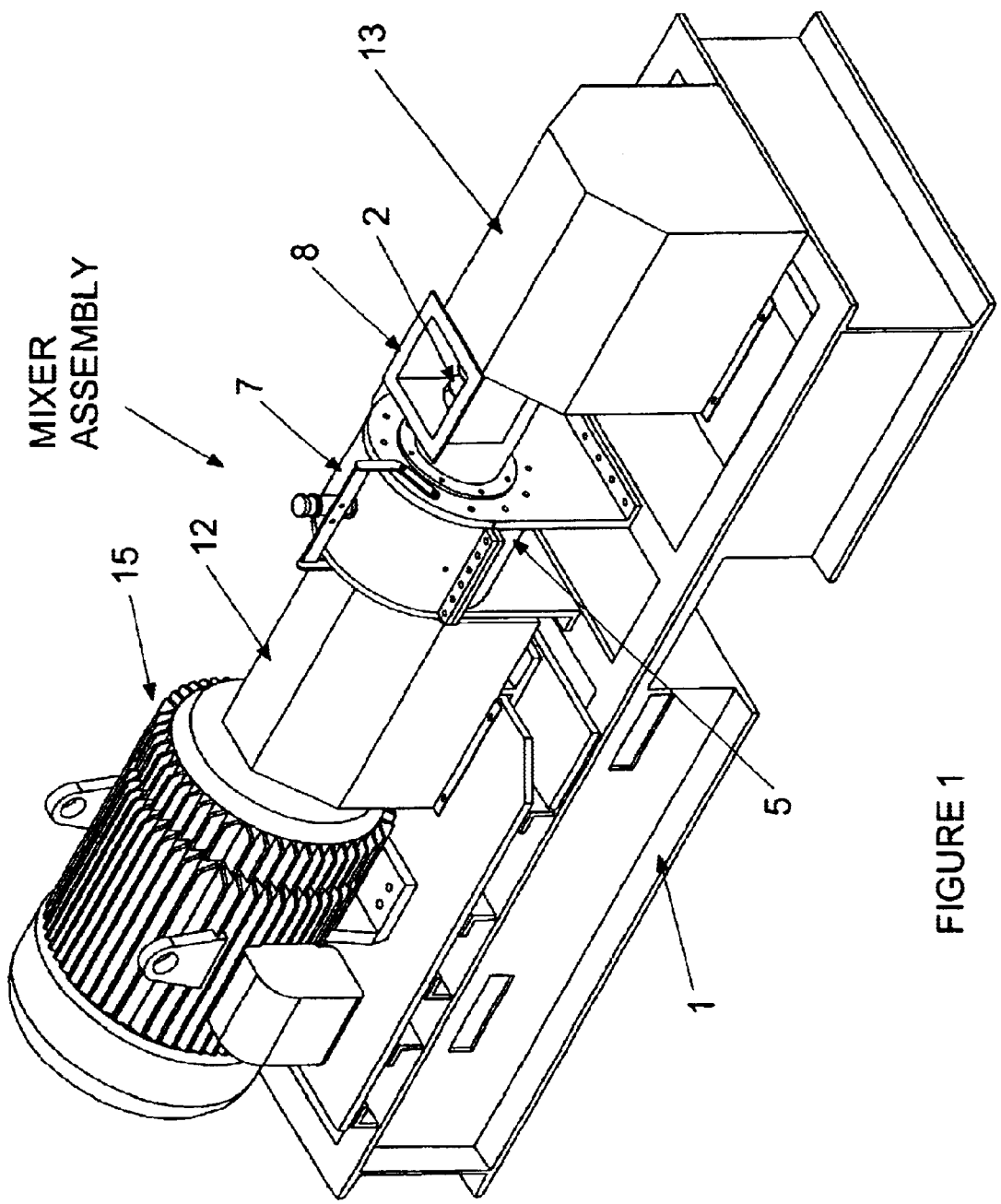
FIGS. 1 and 2 are perspective views of the invention mixer assembly, respectively assembled and exploded views.
Figure 2:
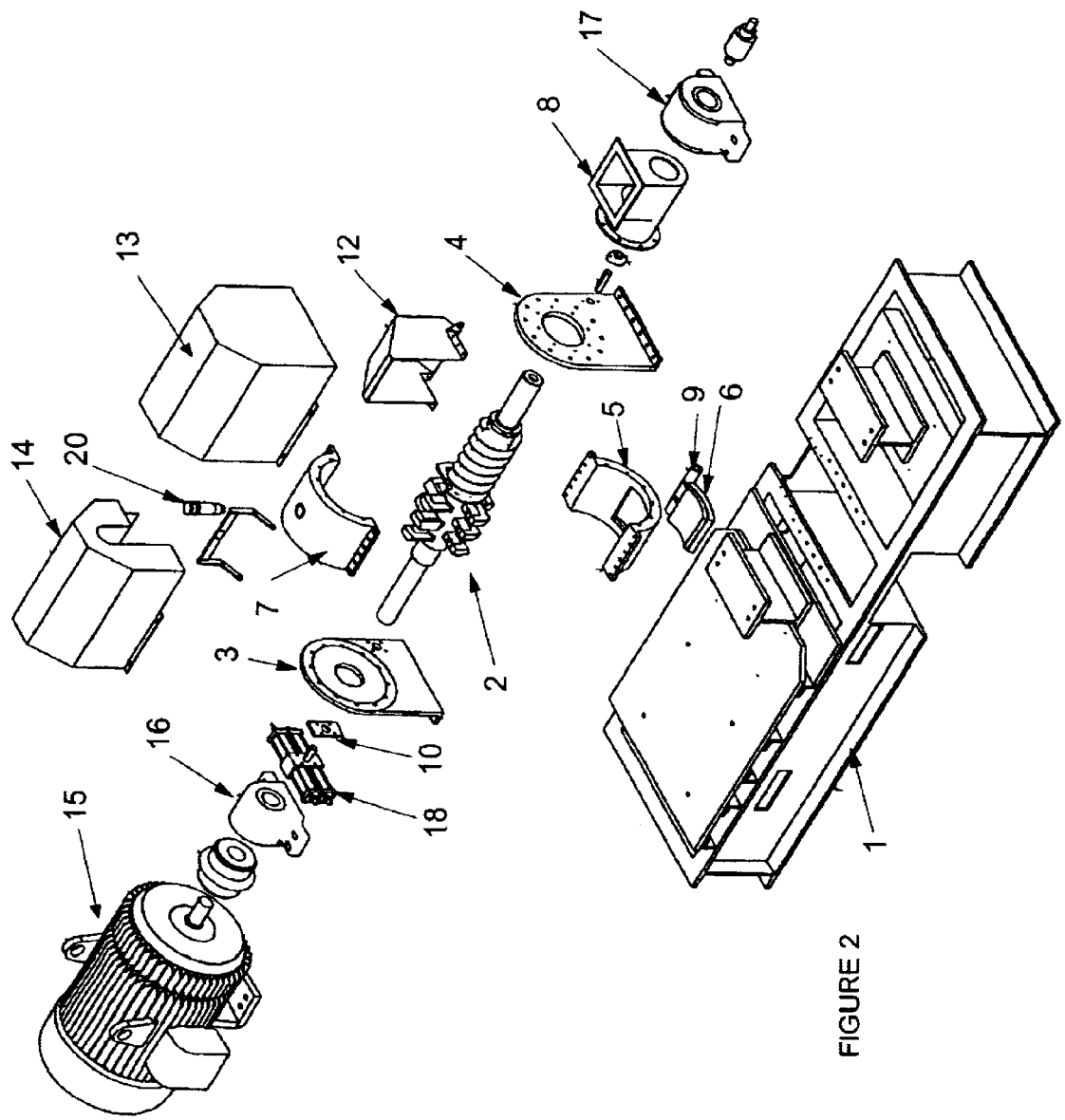

FIGS. 1 and 2 show respectively assembled and exploded perspective views of the invention mixer assembly. The reference numbers of FIGS. 1 and 2 are used only for those figures, although the referenced component names refer to substantially identical components among all the figures. For FIGS. 1 and 2, a frame 1 supports associated components such that a shaft assembly 2 is inserted in an axis of a shaft hole through end plate 3 and a feed screw hole through end plate 4, the two end plates defining enclosing ends of a mixing chamber cylinder, the bottom portion of the cylinder defined by the inside surface of the lower housing 5. Lower housing 5 comprises a dropout opening closed off during operation with discharge door 6. The upper housing 7 comprises an upper part of the cylinder of the inside surface of the mixing chamber of the invention. The feed housing 8 is adapted to permit feeding of material to the feed screw of the shaft assembly so that such material is, in combination with the feed screw rotation, compressingly forced into mixing chamber from an external feed. Door 6 rotatably closes about discharge door pivot pin 9. End plate 3 has attached to it a rack & pinion cylinder 18 with spacer 10 interposed. At the top of housing 7 is mounted a bracket 11 with which to support an IR temperature sensor 20 for the mixing chamber. Door guard 12 protects the sometimes high temperature door 6 from accidental human contact with dropout material. Rotary guard 13 and drive coupling guard 14 guard human operators from contact with rotating components during operation. Drive motor 15 is preferably an electric motor with sufficient power to accomplish the invention operation, but in a specific example below is about 150 HP. The pillow blocks 16 and 17 support the shaft assembly 2.

Figure 3:
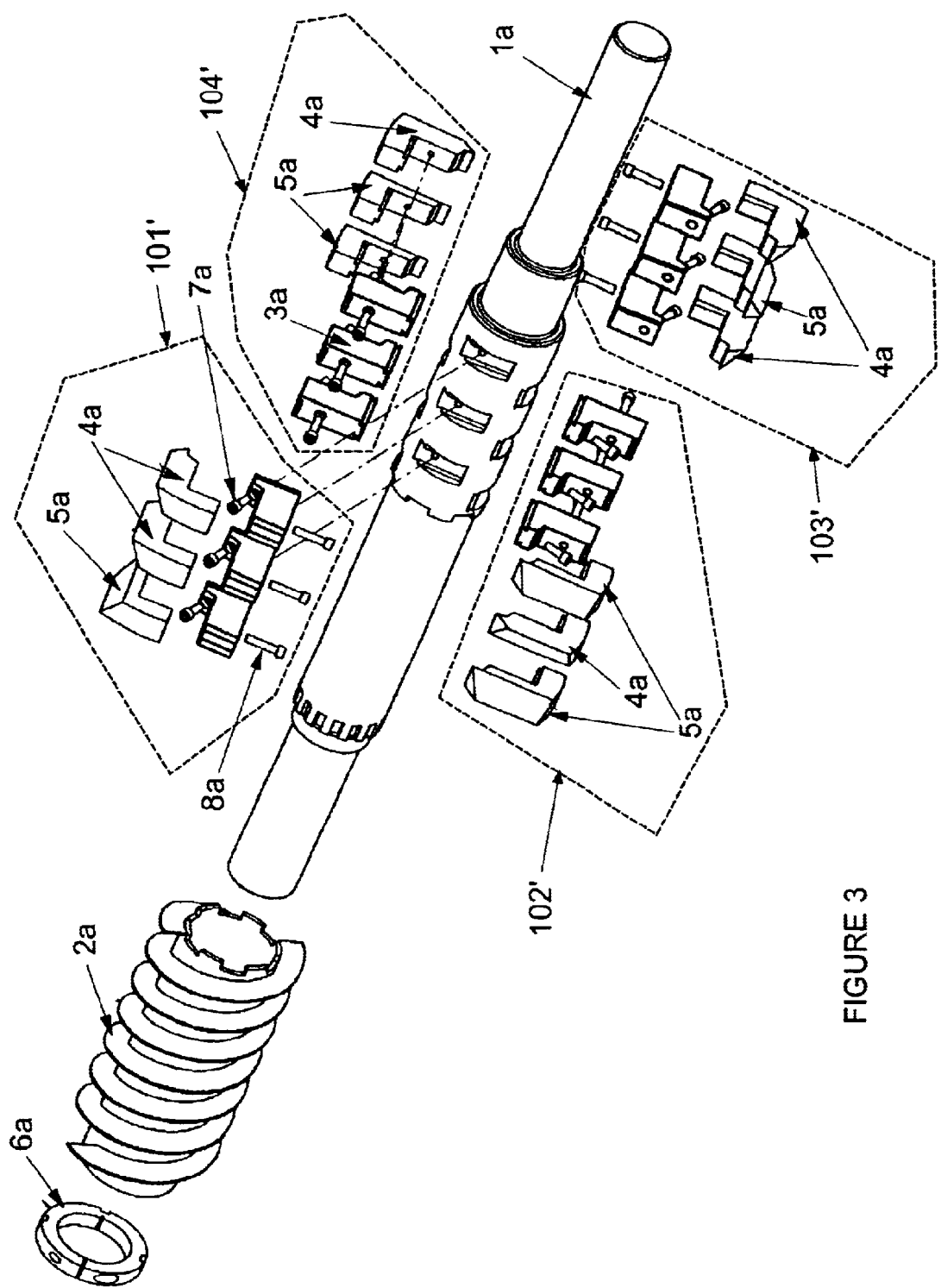
FIG. 3 is an exploded view of the shaft assembly of FIG. 2.

FIG. 3 shows an exploded view of the shaft assembly 2 of FIG. 2. The reference numbers of FIG. 3 are used only for that figure and in FIG. 4, although the referenced component names refer to substantially identical components among all the figures. A series of connected shafts comprise shaft components 1a supported at one end on the bearing 6a. The feed screw 2a engages at the visible end of its hollow shaft the noticeable spline of the shaft components 1a such that appropriate rotation of the shaft causes the feed screw also to rotate. One preferred form of the invention comprises the tooth bases 3a being connected to either of a left edge tooth 4a or a right edge tooth 5a by slots and keys and tooth base screws 8a to teeth 4a or 5a, whereafter the bases 3a are connected by slots and keys and tooth base to shaft screws 7a to the shaft, thereby forming removable base 3a and teeth 4a or 5a assemblies. This removable assembly concept for thermokinetic mixers is unknown in the prior art. The breadth of the concept of this aspect of the invention includes providing equivalent removable shaft extensions for all thermokinetic mixers. The disclosure herein enables the skilled person to adapt the removable extension concept to such prior art devices as disclosed above. The concept of the abutting slot and key attachments with securing screws has heretofore been unknown. More specifically, the base 3a may be attached by welding wherein only a portion of the shaft extension is removably attached as described herein. Or in the alternate, the teeth 4a or 5a or equivalent end portion of a shaft extension are a single piece with a base 3a or its equivalent in the prior art, the entire shaft extension thereafter being removable as disclosed herein for base 3a from the shaft comprising slots therefore. First row slots teeth sets 101', second row slots teeth sets 102', third row slots teeth sets 103', and fourth row slots teeth sets 104' correspond respectively with the first row slots 101, second row slots 102, third row slots 103, and fourth row slots 104 as shown and described in and for FIG. 4. The pattern of teeth 4a and 5a in FIG. 3 are a preferred embodiment of the invention. In one embodiment, a row slots teeth set comprises all teeth 4a and 5a. In another embodiment, all row slots teeth sets comprise all teeth 4a or 5a or each rotationally successive row slots teeth set comprises all teeth 4a followed by one of all teeth 5a. In the embodiment of FIG. 3, each row slots teeth set comprises two teeth, 4a or 5a whereby the rotationally adjacent row slots teeth sets to each such set comprises two teeth 4a or 5a respectively. A most specific embodiment of FIG. 3 shows first row slots teeth sets 101' with left to right teeth 5a/4a/4a, second row slots teeth sets 102' with left to right teeth 5a/4a/5a, third row slots teeth sets 103' with left to right teeth 4a/5a/4a, and fourth row slots teeth sets 104' with left to right teeth 5a/4a/4a. As shown in FIG. 4, this pattern produces a set to set staggering of the teeth faces as they rotate into a plane passing through the shaft 100 axis. This sets pattern of teeth faces With reference to rest of the FIGS. 4–17, shaft components 1a are further shown to comprise an attachment shaft section 100 whereupon are located some of the attachment means for attaching bases 3a to the shaft components 1a. In this side view, first row slots 101, second row slots 102 and third row slots 103 are visible, a fourth row slots 104 existing on the opposite side of the section 100 and further disclosed in FIG. 6.

The slots and keys referenced herein comprise a preferred embodiment of abuttable slots having an open and closed end, the mateable key on another piece insertable into the open end and the first inserted end of the key then being moved from the open to the closed end of the slot to thereby abut the closed end of the slot. It is intended that rotation of the shaft 100 in the direction from the closed to open ends of the slots 101–104 will thereby cause the engaged first inserted end of the keys of the teeth bases to be pressed more securely into the slots 101–104 of shaft 100. Thus, each slot 101–104 has a slot length 105 in a preferred embodiment of about 1.75 inches divided exactly in two by one of two shaft axial planes normal to each other, whereby an open end of the slot is extended further along the shaft 100 such that the bases keys may be inserted, the further extension being about 0.625 inches, the combined slot lengths equaling about 2.375 inches.

Figure 10:
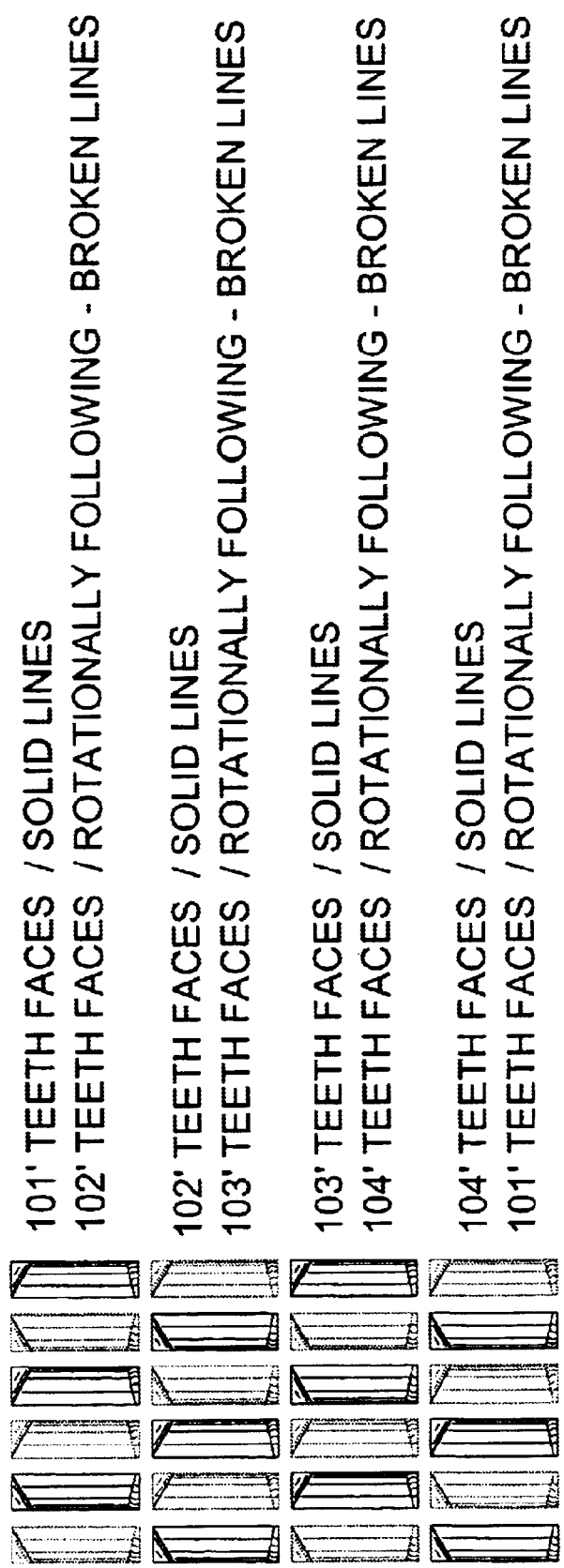
FIG. 10 are teeth face orientations of sets according to the invention of FIG. 2.
Figure 19:
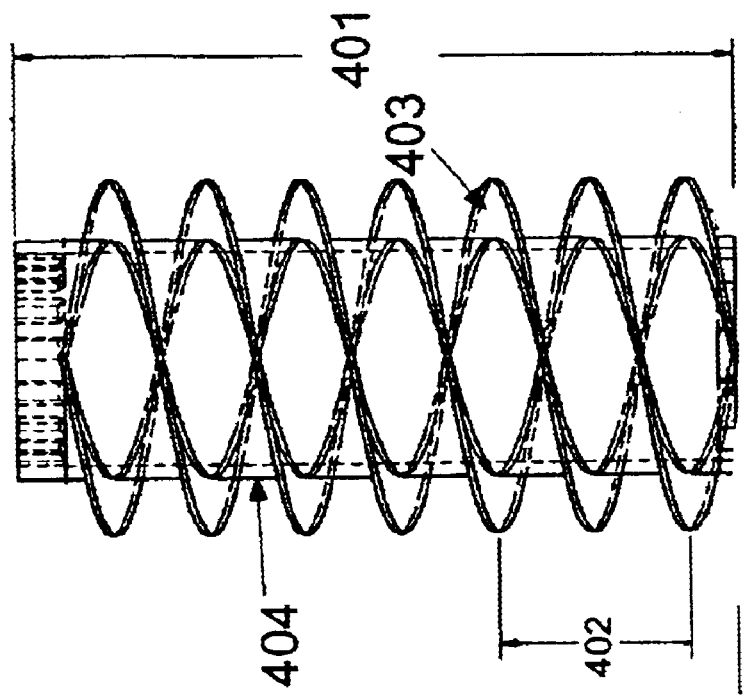
FIGS. 18 and 19 are perspective and broken line side views of the feed screw.

Each slot 101–104 further comprises a base to shaft screw 7a hole 106 threaded to receive screws 7a. The holes 106 are oriented to encourage retention of the tooth base key in the slots 101–104. The slots 101–104 are about 1.25 inches wide and 0.75 inches deep with internal cross section notches extending into the slot rectangle about 0.25 inches. The slot floor to floor width 107 is about 3.5 inches. Hole 106 angle 108 is about 20 degrees. For slots 101–104, the slot centerline to centerline distance 110 is about 1.75, whereby it will be appreciated that each row slots teeth set is axially lengthwise staggered from its rotationally adjacent row slots teeth set. Preferably, the staggering is such that teeth of two rotationally adjacent row slots teeth sets passing through an axial plane in operation rotation are equally spaced. As a definition of a specific example herein, FIG. 10 shows teeth faces of the sets 101'–104' in solid lines as they would appear rotationally passing the plane view as shown by the teeth faces 103' TEETH FACES in FIG. 9. In broken lines in FIG. 10 are shown the rotationally following set of teeth faces, as would be encountered by a particle in the mixing chamber striking a tooth face of one set if passing through the teeth of that set to encounter the teeth faces of the next set. For example, all the sets 101'–104' comprise, as easily seen in FIG. 10, left to right adjacent teeth faces 5a and 4a (as in FIG. 3), such that the inclination of those adjacent tooth faces tends drives all particles encountered from just below the top inclined face in between the gap formed by such adjacent tooth faces. The major tooth faces of such adjacent teeth form a rough "V" shape with a gap in between. The effect of such combination of adjacent teeth causes the particles thus funneled to the gap to encounter the gap-filling tooth in the rotationally following set. Notwithstanding this more limited, albeit preferred embodiment, of adjacency of teeth faces, it is preferred that the staggering of teeth in rotationally adjacent sets result in a substantially gap-filling action as shown in FIG. 10 so that particles encountering a first set of teeth may strike them and/or be funneled to a gap between adjacent teeth in a set such that a rotationally following set tooth face is oriented to fill such a gap when it rotates to the position of the leading set. As further described below, the tips of the teeth of sets 101'–104' when installed define a width 325 and a height 326 within an Inside chamber circumference 327.

Shaft components 1a further comprises spline attachment means 109 is constructed and oriented to securingly engage the appropriate end of a mating extension for shaft 100 and spline attachment means 109A constructed and oriented to securingly engage the appropriate end of a the feed screw 2a of FIG. 3, thereby causing the feed screw to rotate with shaft components 1a.

FIGS. 11–17 are discussed now for a detailed discussion of the teeth bases and teeth. The specific example described is an optimized device. This disclosure more broadly includes replaceable shaft extensions or at least upper portions of shaft extensions for thermokinetic mixers. Tooth base 200 has a base height 201 of about 3.5 inches, a width 202 of about 2.375 inches, a support width 203 of about 1.75 inches. A top end of the base 200 comprises a slot 204 for receiving a key from a tooth and at the bottom a shaft key 205 for insertion into the shaft 100 slots 101–104. The key height 206 is just less than 0.25 inches, the slot depth 207 is about 0.19 inches, the key width 208 is just less than 1.25 inches, the key attachment width 209 is just less than 0.75 inches. The base 200 comprises a tooth base to shaft screw hole 210 for receiving a screw for securing the tooth 300 to base 200 after insertion of the tooth key into the slot 204. The base 200 comprises tooth to tooth base screw hole 211 for receiving a screw for securing the base 200 to shaft 100 after insertion of the base key 205 into a slot of slots 101–104. The slot base width 212 is about 0.875 inches and the slot top width 213 is about 0.05 inches.

Right leading edge tooth 300 (as shown in FIG. 3 as teeth 5a) comprises attachment means for attaching to the tooth base 200. When the tooth base is engaged with a slot of slots 101–104, the appropriately attached tooth 300 presents a tooth face to a shaft 100 axial plane when the tooth 300 rotates about shaft 100. The tooth face comprises a reticulated major face 300 having an acute angle with respect to said plane, the vertex of that acute angle being the leading edge 304 of the major face. The presentation of the leading edge 304 is preferably linear and parallel to the said plane, although such leading edge may be slightly angled into or away from said plane and still accomplish objects of the invention. The shape of the leading edge 304 may comprise smooth transitions or notches and still accomplish the object of the invention.

A forming of such an angled major face 304 on a tooth face is heretofore unknown in the art of thermokinetic mixers. The effect of the angled major face in operation of the mixer assembly is to drive a majority of mixing chamber particles encountering the angled major face to one side or another of the supported tooth. Prior art thermokinetic mixers are intended as devices for throwing particles at the inside surfaces of a mixing chamber. The present invention tends to retain particles within a rotational cylindrical space between the shaft 100 surface and the tips of the teeth until such particles melt and/or agglomerate or are captured by melted polymers at the extra-cylindrical space clearance between the tooth tips and the inside surface of the mixing chamber. The major angled faces of the teeth make the invention device specifically adapted to melt blending polymers and/or non-melting filler polymers or other material. The above disclosure as to the teeth face presentations in FIG. 10 clearly show that mixing chamber particles will be driven not only against the teeth and inside surface of the mixing chamber, but also inevitably with great force against each other. The invention device permits an unexpectedly large number of non-recyclable or limited value recyclable materials to be made into very useful compositions after melt blending therein.

The tooth 300 comprises in one preferred from a leading edge width 301 of about 3.2 inches, a following edge width 302 about 2.4 inches. A key 305 is formed in the upper convex portion of the L-shaped tooth 300, which key is insertable into the slot 204. The insertion can only be accomplished in one manner for the key 305 and slot 204 shown. Thus, the tooth 300 forms a protective cap or shield to the tooth base 200 as to encountering mixing chamber particles. A tooth to tooth base screw hole 306 receives the screw 8a as in FIG. 3 for securing the tooth 300 to the tooth base 200. The tooth 200 further comprises a leading edge side 307, a following edge side 308, and a lower bevel face 309. Lower bevel face 309 comprises a portion of the tooth face below angled major face 304 in shaft 100 axis elevation. This face is preferred for avoiding agglomeration of melted particles at the shaft 100 to tooth base 200 transition, although such a face may be minimized or eliminated with substantially the function of the invention device preserved.

Tooth height 310 is about 4.5 inches, making total tooth sets 101/102 or 103/104 height 326 about 12.95 to 12.98 inches and total tooth sets 101/102 or 103/104 width 325 is about 8.25 inches. Leading edge height 311 is about 3.325 inches. Tooth 300 further comprises a lower face bottom edge 312 which rises to a lower face height 313 of about 0.75 inches. Tooth length 314 is about 3.2 inches and tooth less leading edge length 315 is about 1.75 inches. Top face 316 comprises a third portion of the tooth face. Faces 303 and 309 generally deflect particles in the mixing chamber toward the gap in teeth in a set. Top face 316 tends to drive particles into collision with the inside surface of the mixing chamber. Bottom slot width 319 is about 0.875 inches, top slot width 320 is about 0.50 inches, slot depth 321 is about 0.19 inches, and tooth width 322 is about 1.25 inches.

Following edge 323 is the edge of major face 303 opposite leading edge 304. It has been observed that in operation tooth top leading edge corner 324 becomes substantially worn after melt blending polymers and in fact the entire top transition edge between major face 303 and top face 316 becomes quite smooth and is abraded more than any other portion of the tooth in the preferred operation of melt blending.

The mixing chamber inside surface outline 327 as in FIG. 4 has a circular diameter of about 13 inches and a width of about 10 inches, for a mixing chamber volume of about 1325 cubic inches. The clearance between the tooth tips and the inside of the mixing chamber walls is about 0.5 inches, thereby providing very little of the mixing chamber volume outside of the reach of the teeth.

Figure 18:
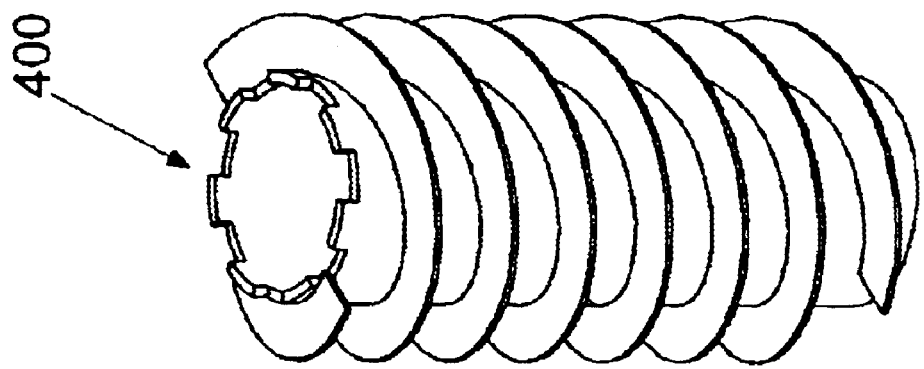
Figures 27, 28:
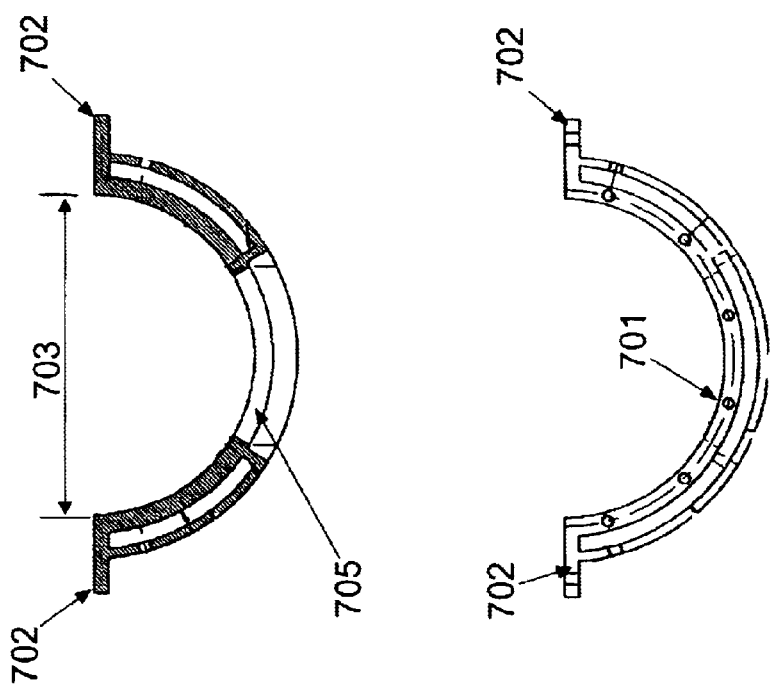
Figure 26:
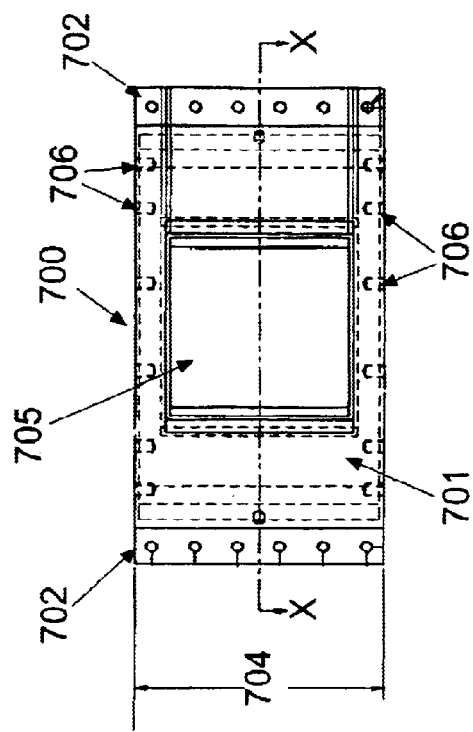

FIGS. 18 and 20 show the feed screw 400 having shaft 404 with a length 401 of about 14 inches and two complementary screw blades 403, each having a pitch or crest to crest distance 402 of about 4 inches. A single screw blade on the feed screw is adequate to an achieve the invention objects.

FIGS. 20 to 25 show views of the mixing chamber end plates. Feed screw end plate 500 comprises an end plate 501, an end plate base 502, end plate to housing bolt holes 503 in plate 501, a feed screw hole 504 sufficiently large to accommodate rotation of the feed screw 400, housing inside surface circumference 505 approximately defining the mixing chamber inside circumference of the circular section, and a mixing chamber surface 506. Shaft end plate 600 comprises an end plate 601, an end plate base 602, an end plate to housing bolt holes 603 in plate 601, feed screw hole 604 sufficiently large to permit rotation of shaft 100 without escape of particles or molten polymer, a housing inside surface circumference 605 approximately defining the mixing chamber inside circumference of the circular section and a mixing chamber surface 606.

FIGS. 26 to 31 show views of the mixing chamber housings. Bottom housing 700 comprises an inside surface 701, flange section 702 for joining with top housing 800, an inside diameter 703, a width 704 of about 10 inches, a dropout opening 705 about 7.25 inches square for allowing molten material to drop from the mixing chamber after shaft 100 rotation has stopped. End plate bolt holes 706 permit attachment to the end plates.

Top housing 800 comprises an inside surface 801, flange section 802, inside diameter 803, sensor opening 804 for insertion of an IR sensor for mixing chamber temperature, a width 805 of about 10 inches, and end plate bolt holes 806 to permit attachment to the end plates.

Figure 32:
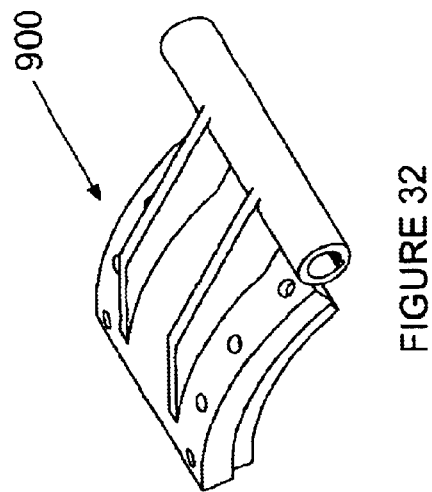
Figure 34:
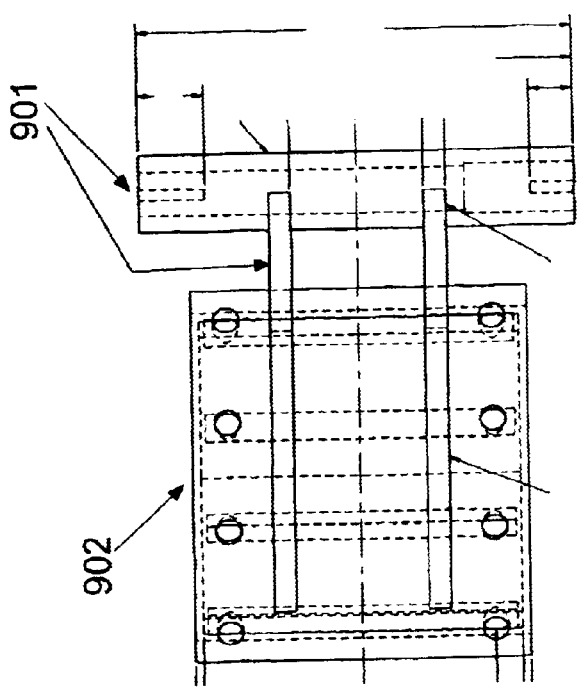
Figure 33:
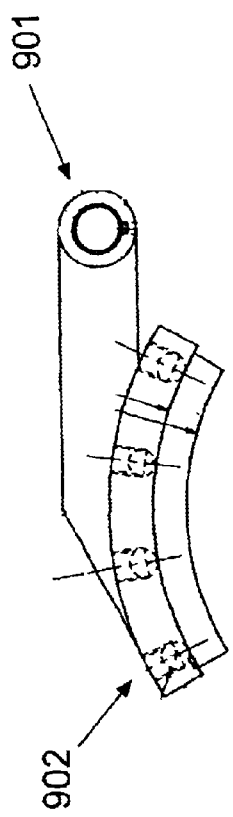

FIGS. 31 to 33 disclose views of the dropout opening door 900 comprising a handle portion 901 and a door 902, which door Is rotatable about a hinge for securingly closing the mixing chamber during operation.

The invention device includes the concept of melt blending polymers and other meldable material into a composition capable of being made into a useful object. The shaft 100 is intended to rotate such that the teeth faces will collide with particles of substantial size (about the feed screw blades separation width) to powders. When in operation, the housing 8 of FIGS. 1 and 2 accommodate insertion of such particles. The feed screw forces the particles into the mixing chamber to comminuted and melt blended. The rotational speed of the shaft can vary from below about 1800 rpm (to about 1500 rpm) to above about 3600 rpm. The choice of shaft speed will depend on the polymers and other materials being processed and the processing temperature desired to be reached. For example, a mixture with a very high weight percentage of PVC (normally not recyclable or only in very low relative amounts with other polymers) may be melt blended at 1800 rpm to its processing temperature, say around 120–200 C as measured by the IR sensor for the mixing chamber.

When a desired processing temperature is sensed by the temperature sensor for the charged amount of one or several materials within the mixing chamber and contrary to the methods of the prior art for melt blending for thermokinetic mixers, rotation of the shaft is preferably continued at the set rotation speed. It has been an unexpected result that an opening of the dropout door will substantially empty the mixing chamber of a substantially uniform composition of molten and moldable material without having to stop the shaft rotation. It is preferred that a control means cause the opening of the dropout door to occur at the sensing of an upper limit temperature by the temperature sensor. The dropout door preferably instantly closes after the release of the melt blended charge, thereby initiating feed of another amount of charge material to housing 8, feed screw transfer to the mixing chamber, heating by thermokinetic effect and release from the mixing chamber through the dropout door once again without substantial adhesion to the shaft or teeth or shaft extensions. The mixing chamber sensed temperature falls upon introduction of a new feed charge to the mixing chamber. The average cycle time for melt blending a charge for the device of the specific example is about 5–8 seconds. Some materials in the charge to the mixing chamber with low melting temperatures, such as PVC, have a lower cycle time (by a few seconds) while other materials take longer. At around 3600 rpm, the invention device heats and melts a mixing chamber mixture of polyolefins to about 230 C in about 5 seconds. A more preferred operating speed is about 2800 rpm so that a desired ultimate batch temperature may be more easily controlled and obtained.

It is a less preferable method of operation to stop the shaft rotation for emptying of the mixing chamber, although the objects of the thermokinetic heating and melt blending of a very broad range of incompatible materials may be so processed.

The top and bottom housings are double walled so that water can be flowed through them to cool the housing during operation. It is preferred that the clearance between the tips of the teeth and the mixing chamber wall be small, although some of the objects of the invention device could be achieved with substantial clearance therefore.

The number of teeth in each rotationally successive set should be equal and staggered as described above although using from 2 to 10 teeth in each seat will accomplish the ends of the invention device. It will be clear from this disclosure that increasing the number of teeth or extending their tip to tip height requires an expansion of the mixing chamber and therefore an increase in the drive motor for the shaft 100 and feed screw. Those adaptations will permit an increase in the batch size processed. The volume of the material to be processed in the invention device should be limited to about less than the volume of the mixing chamber less the volume of the shaft 100 and sets 101'–104'. An invention device using only two sets 101' and 103' or 102' and 104' may be used to accomplish some of the objects of the invention, although use of all four sets are preferred.

The acute angle of the major face with respect to a plane including the shaft axis is as shown in FIG. 15 is about 45 degrees, although the invention may be practiced with such angles equaling from 5 to 85 degrees, more preferably 20 to 70 degrees, and most preferably from 30 to 60 degrees.

The above design disclosures present the skilled person with considerable and wide ranges from which to choose appropriate obvious modifications for the above examples. However, the objects of the present invention will still be obtained by the skilled person applying such design disclosures in an appropriate manner.

I claim:
1. A thermokinetic mixer comprising:
   (a) a substantially cylindrical mixing chamber with an inside surface enclosing a shaft connected with a motor driver outside the mixing chamber and rotatable at relatively high speed substantially about an axis of the cylindrical mixing chamber, the mixing chamber having an opening at a first end of the cylinder that communicates with a screw feeder, where the screw feeder comprises screw blades mounted on an exten- sion of the shaft and are enclosed with a cylindrical housing open at an inlet port, the screw feeder being adapted to receive a particulate feed material comprising an effective amount of particles of polymers meltable at operating conditions and to deliver the feed material to the mixing chamber;

(b) shaft extensions secured to the shaft by slot means for removing the shaft extensions when the mixing chamber is emptied and the shaft is stopped, the slot means comprising a single rectangle slot located at a base of the shaft extensions where a forward edge of the slot in the direction of rotation of the shaft has a relatively smooth transition to an outside surface of the shaft and a rearward edge of the slot is substantially stepped down from the outside surface of the shaft;

(c) a door located substantially spaced apart from and between the ends of the mixing chamber and along a bottom surface of the mixing chamber; and (d) the door being adapted to open after the feed material is mostly melted and mixed together so that the feed material can drop from the mixing chamber.

2. The mixer of claim 1 wherein the shaft extensions comprise a base and an end portion, the end portion being removable from the base portion and the base portion being removable from the shaft.

3. The mixer of claim 2 wherein the end portion comprises a tooth face comprising a major face, the major face being substantially flat and oriented such that when passing through a plane including the shaft axis the major face first encounters the plane with a leading edge of the major face and the major face extends along an acute angle therefrom away from the plane.

4. The mixer of claim 3 wherein the leading edge comprises most of a height of the shaft extensions.

5. The mixer of claim 3 wherein the shaft extensions rises from the shaft to very close to the inside surface.

6. The mixer of claim 3 wherein the base portion is secured to the shaft by slot and key means.

7. The mixer of claim 6 wherein the end portion comprises a substantially complete shield for the base portion from the particles during rotational operation of the mixer.

8. The mixer of claim 7 wherein the tooth face further comprises a lower bevel face extending away from the plane from a lower edge of the major face at a greater angle to the plane than the major face.

9. The mixer of claim 8 wherein the tooth face further comprises a top face extending away from a top edge of the major face and adapted to drive the particles into the inside surface.

10. A thermokinetic mixer comprising:

(a) a substantially cylindrical mixing chamber with an inside surface enclosing a shaft connected with a motor driver outside the mixing chamber and rotatable at relatively high speed substantially about an axis of the cylindrical mixing chamber, the mixing chamber having an opening at a first end of the cylinder that communicates with a screw feeder, where the screw feeder comprises screw blades mounted on an extension of the shaft and are enclosed with a cylindrical housing open at an inlet port, the screw feeder being adapted to receive a particulate feed material comprising an effective amount of particles of polymers, meltable at operating conditions and to deliver the feed material to the mixing chamber during rotation of the shaft;

(b) four or more shaft extension rows equidistantly spaced around the length of the shaft in the mixing chamber, where each shaft extension row consists of three or more shaft extensions arranged in a row lengthwise on and extending radially from the shaft, each shaft extension comprising a major tooth face oriented such that during rotation of the shaft the major tooth face passes through a plane including the shaft axis first at a sharp leading edge and thereafter only along a substantially flat or slightly curved surface extending from the leading edge rearward from the leading edge and at an angle of from 20 degrees to 70 degrees rearward from the plane, whereby when the shaft is rotated at high speed, the orientation of each major tooth face is adapted to strike more than a majority of the feed material particles that strike the shaft extension causing them to be substantially all driven to a side of the shaft extension opposite the leading edge:

(c) each shaft extension further comprising a top extension surface extending rearward from the direction of shaft rotation, the top extension surface being a solid surface defined by the boundaries of:

i) a top edge of the major tooth face, that top edge comprising a forwardmost point and a rearwardmost point; and ii) a line parallel to the shaft axis from the rearwardmost point to the intersection with a line directly rearward from the forwardmost point; and (d) a door located substantially spaced apart from and between the ends of the mixing chamber and along a bottom surface of the mixing chamber, the door being adapted to open after the feed material is mostly melted and mixed together so that the feed material can drop from the mixing chamber.

11. The mixer of claim 10 wherein the shaft supports at least two rows 180 degrees apart of shaft extensions along the length of the shaft.

12. The mixer of claim 10 wherein the shaft supports at least four rows 90 degrees apart of shaft extensions along the length of the shaft.

13. The mixer of claim 10 wherein the leading edge comprises most of a height of the shaft extension.

14. The mixer of claim 13 wherein the shaft extensions rises from the shaft to very close to the inside surface.

15. The mixer of claim 13 wherein the tooth face further comprises a lower bevel face extending away from the plane from a lower edge of the major face at a greater angle to the plane than the major face.

16. The mixer of claim 15 wherein the tooth face further comprises a top face extending away from a top edge of the major face and adapted to drive the particles into the inside surface.

\* \* \* \* \*